Oct. 11, 1949.　　　　　G. A. SWARTZ　　　　　2,484,195
SIGHT ALIGNMENT MEASURING DEVICE
Filed June 27, 1947　　　　　　　　　　　　2 Sheets-Sheet 1

INVENTOR.
GEORGE A. SWARTZ,
BY
ATTORNEY

Oct. 11, 1949.   G. A. SWARTZ   2,484,195
SIGHT ALIGNMENT MEASURING DEVICE
Filed June 27, 1947   2 Sheets-Sheet 2
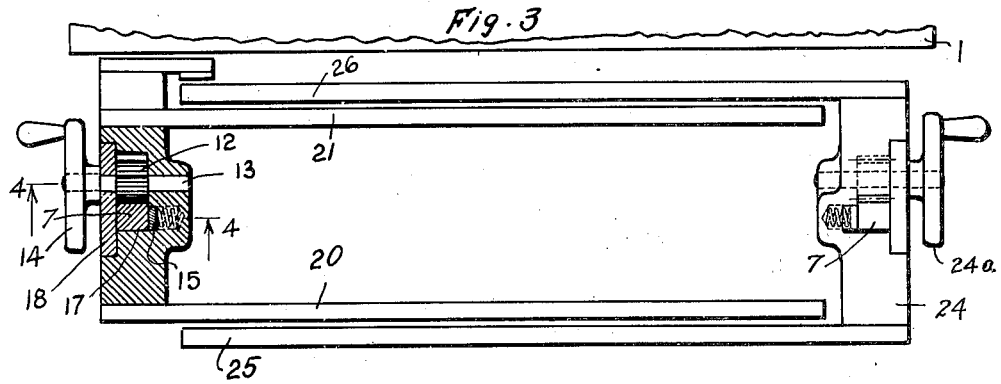
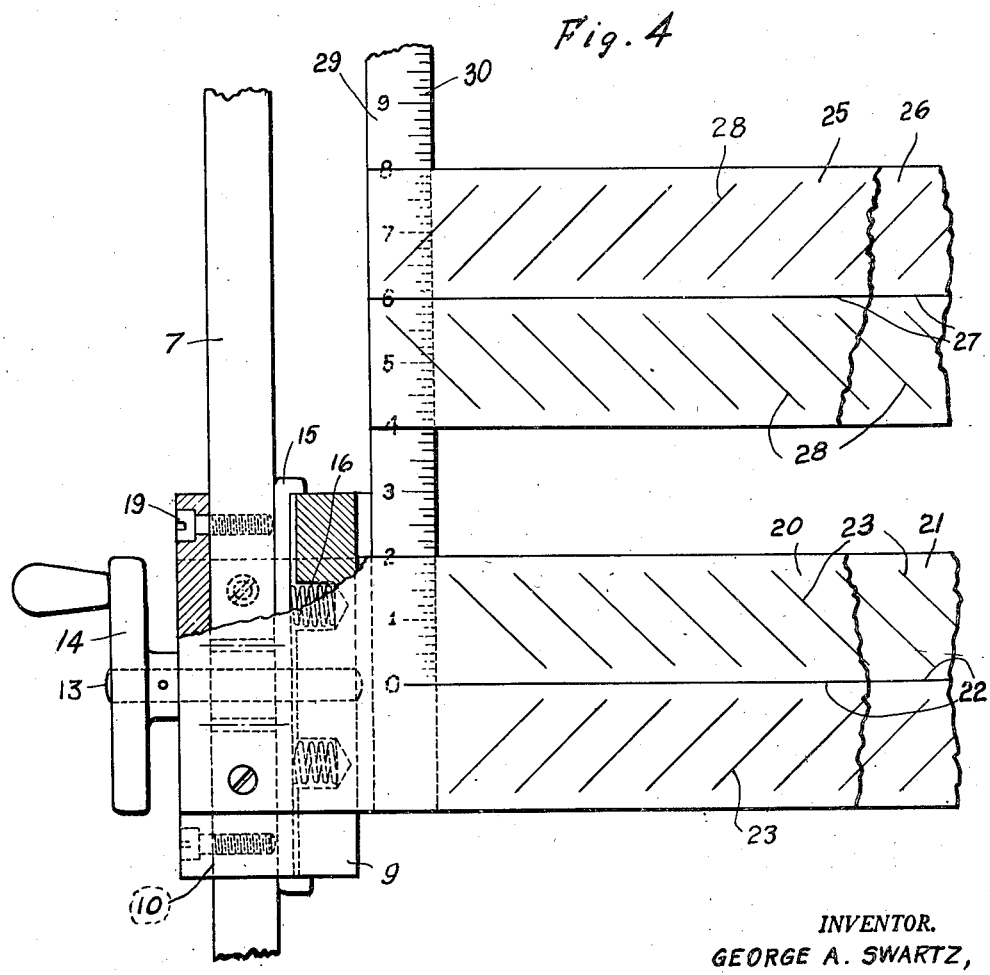
INVENTOR.
GEORGE A. SWARTZ,
BY
Harry V. Cook,
ATTORNEY Patented Oct. 11, 1949

2,484,195

UNITED STATES PATENT OFFICE 2,484,195

SIGHT ALIGNMENT MEASURING DEVICE

George A. Swartz, Millington, N. J.

Application June 27, 1947, Serial No. 757,503

4 Claims. (Cl. 33—63)

This invention relates in general to a device for making dimensional inspection and checking of articles or devices, particularly castings and patterns from which castings are made.

It is frequently desirable to ascertain the distances between points on irregular surfaces which cannot be measured with a tape or rule directly applied to the surface, for example, upon the surface of a casting having bosses or other projections thereon. It invariably happens that in castings having a multiplicity of bosses through which holes are to be bored, the bosses are at least slightly out of position so that if the holes are bored in accordance with dimensions given on the drawing of the pattern, they will not be centrally located in the bosses. Since it is desirable to get the holes as nearly central as possible, an inspection of the casting must precede the machine work on the casting.

One object of the invention is to provide a device which will enable inspections and measurements of the general character described to be easily, quickly and accurately made.

Another object is to provide such a device which shall include novel and improved means whereby spaced points on a casting or other article may be accurately sighted and the distance therebetween gauged or measured.

A further object is to provide a sight alinement measuring device which shall include a novel and improved construction and combination of two sight elements, and means for relatively moving said elements in parallel planes toward and from each other, whereby the two sight elements can be moved transversely of a surface to be gauged or measured and sighted respectively upon spaced points on said surface.

Other objects are to provide a device of this character which shall embody novel and improved, simple and inexpensive features of construction, and shall be simple in operation; and to obtain other advantages and results that will be brought out by the following description when considered in conjunction with the accompanying drawings, in which Figure 1 is a front elevational view of a sight alinement measuring device embodying my invention;

Figure 3 is an enlarged top plan view of the device, with portions broken away approximately on the plane of the line 3—3 of Figure 1, and Figure 4 is an enlarged fragmentary front elevational view of portions of the sight elements.

Figure 1:
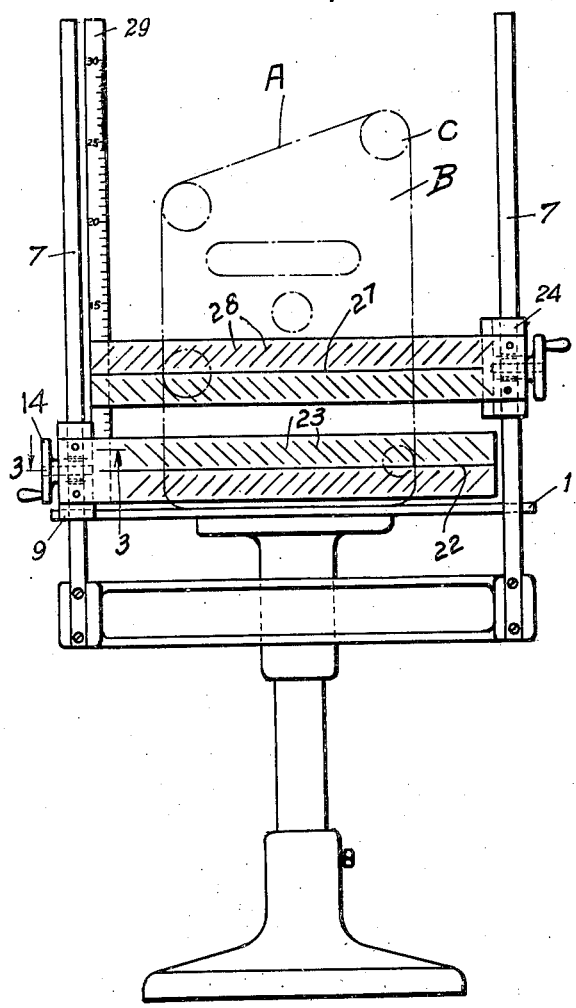
Figure 2:
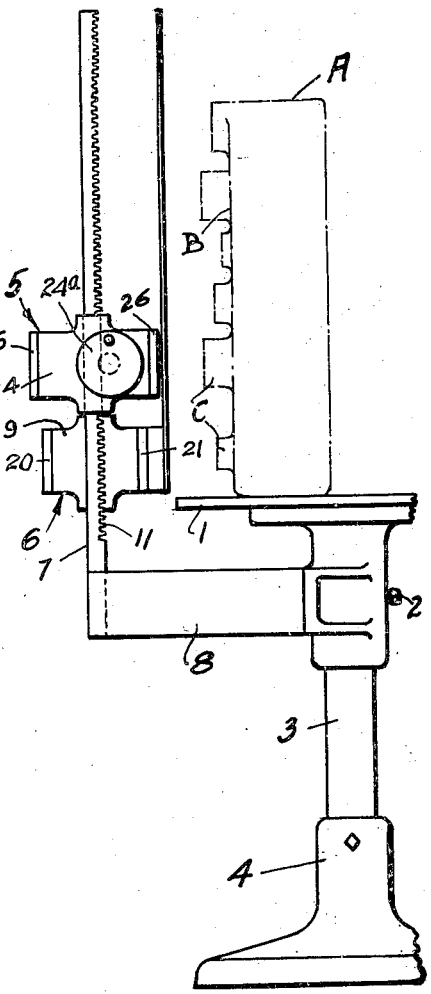
Figure 2 is a side elevational view thereof, with portions broken away.

Specifically describing the illustrated embodiment of the invention, the device comprises a table or bed 1 which is adjustably mounted, as by a set screw 2, on a standard 3 which is mounted, preferably adjustably, upon a base 4. The table serves as a support for the articles or devices to be measured or inspected, for example, a casting A which is illustrated in dot and dash lines in Figures 1 and 2, and has an irregular surface B that includes bosses or other projections C projecting from one side thereof. The base 4, standard 3 and table 1 thus constitute in effect a pedestal for supporting the articles to be measured or inspected.

At one side of the table 1 and movable in vertical planes are two sight elements 5 and 6, each of which is mounted on a vertical bar 7 that is in turn supported by a bracket arm 8 which projects laterally from the pedestal of the device. The lower sight element 6 includes a rider or carrier block 9 which has a vertical opening 10 therethrough to receive the corresponding vertical bar 7 so that the sight element may be vertically slid up and down on said bar. For moving the rider block or carrier 9 along the bar 7, I have shown a gear rack 11 on one side of the bar with which meshes a pinion 12 that is carried by a stub shaft 13 which is journaled in the carrier and has a hand wheel 14 for rotating it. For frictionally holding the carrier in adjusted positions on the bar 7, a friction block 15 is mounted in the carrier and held in frictional contact with the rack bar 7 by springs 16. For convenience in mounting the carrier on the rack bar, the carrier has a longitudinal groove 17 in one side thereof in which the rack bar 7 and pinion 12 are located and which is closed by a cover plate 18 secured to the body of the carrier by screws 19. The carrier 9 supports two transparent parallel sight plates 20 and 21, which are spaced from each other horizontally and have corresponding horizontal sight lines 22 above and below each of which are a plurality of diagonal auxiliary sight lines 23 that are preferably disposed at angles of 45° to the sight lines 22. These sight lines and auxiliary sight lines may be applied in any suitable manner, for example, by etching, printing, etc., and may be of various forms.

The upper sight element 5 is similarly constructed and includes a rider 24 which is constructed and mounted on the rack bar 7 in exactly the same way that the rider 9 is constructed and mounted on said bar, and the rider is actuated by a hand wheel 24a which corresponds to the hand wheel 14. The carrier 24 has a pair of parallel sight plates 25 and 26 which are spaced apart horizontally and so arranged that the upper sight plates may pass the lower sight plates when necessary during adjustment of the sight elements on the rack bars. The sight plates 25 and 26 have corresponding horizontal sight lines 27 and diagonal auxiliary sight lines 28 corresponding to the auxiliary sight lines 23.

Carried by and projecting vertically upwardly from the carrier 9 of the lower sight element is a rule or gauge bar 29 so disposed that the sight lines 22 and 27 at least partially traverse the face of the gauge to cooperate with scale graduations 30 thereon. As shown, the scale is divided into inches and fractions thereof, and the zero graduation is coincident with the sight line 22 on the lower sight element.

In use of the device, and assuming that the casting A is to be inspected, the casting is placed on the table 1 with the faces of the bosses in a vertical plane and facing the operator. The lowest boss, or some zone of the surface B adjacent the bottom of the casting when said bottom is to be faced, is smeared with chalk. The sight line 27 of the upper sight 5 is then centered on the next higher boss, or the boss next above the smeared surface, after which the lower sight line 22 is set to the dimension given on the drawing corresponding to the casting. It will be understood that in locating the sight elements, the operator will look through the respective sight plates 20 and 21 or 25 and 26 until the sight lines 22 or 27 on the front plates visually coincide with the corresponding lines on the rear plates and cross the point on the surface B which is to be gauged. In setting the sight lines 22 and 27 for the centers of the respective bosses, the sight elements are adjusted until one pair of the diagonal auxiliary sight lines 23 or 28 become tangent to one of the bosses; when this occurs, the corresponding sight line 22 or 27 will extend diametrically across the boss. Obviously, the adjustment of the sight lines 22 will be effected by manipulation of the hand wheel 14.

With the use of a surface gauge, the zero position on the scale 30 which is in line with the lower sight lines 22, is scribed on the smeared surface. This operation is then repeated for all of the bosses or other points on the surface B which it is desired to measure or gauge. Then said smear will have a number of scribed lines on it, and the point midway between the upper and lower scribed lines may be used as a base from which to work, that is, from which to measure. Where the smear is on the lower boss, the mid point between the upper and lower scribed lines will indicate the center line for the hole to be bored through the boss.

The casting is now turned 90° parallel to the plane of the surface B, after which the above-mentioned operations are repeated. The scribed line midway between the upper and lower scribed lines will intersect the scribed line that was formed midway between the upper and lower scribed lines while the casting was in its initial position; and this point of intersection indicates the correct center for the hole to be bored through the boss. Then using said point of intersection as the base from which to measure for the centers of the holes for the other bosses, the holes when bored in accordance with the dimensions given on the drawing will be positioned to the best advantage in the respective bosses.

It will be understood that the device may be used for simple measurement of the distance between two given points on the surface B by simply adjusting one of the sight elements to one point, then adjusting the other element to the other point and noting the distance between the sight lines 22 and 27 on the scale 30.

When it is desired to check patterns, a suitable shrink rule is put in place of the scale 29, 30. Then the upper and lower sights are adjusted to different points, and the distances between the different points, as indicated by the sight lines 22 and 27 on the shrink rule, can be compared with the dimensions on the drawing from which the pattern was made.

Other uses of the device will occur to those skilled in the art, and it will also be understood that many modifications and changes can be made in the details of construction of the device within the spirit and scope of the invention.

Having thus described the invention, what I claim is:

1. A sight alinement measuring device comprising two sight elements each including a pair of spaced and parallel transparent sight plates having sighting indicia thereon, and means mounting said sight elements for relative movement in parallel planes, said sight plates being mounted for movement of one pair of plates between the plates of the other pair.

2. A sight alinement measuring device comprising a pedestal having a table thereon, a pair of vertical bars mounted on said pedestal and disposed at one side of said table, two sight elements each including a rider mounted to move up and down on one of said vertical bars, a pair of spaced parallel and opposed sight plates mounted on each of said riders in vertical planes parallel to the planes of the plates on the other rider, cooperating sighting indicia on the plates of each sight element, and means for adjusting said riders on their respective vertical bars.

3. The sight alinement measuring device as defined in claim 2, with the addition of a scale carried by one of the sighting elements and cooperatively related to the sighting indicia of both of said sight elements.

4. A sight alinement measuring device comprising two sight elements each including a pair of spaced and parallel transparent sight plates having sighting indicia thereon, and means mounting said sight elements for relative movement in parallel planes, said sighting indicia comprising corresponding parallel straight main sight lines on each plate of each pair, and a plurality of parallel diagonal auxiliary sight lines at each side of each main sight line, diagonal lines at one side of each main sight line being perpendicular to the diagonal lines at the other side of said main sight line.

GEORGE A. SWARTZ.

REFERENCES CITED

The following references are of record in the file of this patent:

UNITED STATES PATENTS

| Number | Name | Date |
|---|---|---|
| 1,709,310 | Dahl | Apr. 16, 1929 |
| 1,820,447 | Curry | Aug. 25, 1931 |

FOREIGN PATENTS

| Number | Country | Date |
|---|---|---|
| 11,165 | Great Britain | June 8, 1894 |